No. 752,748. PATENTED FEB. 23, 1904.
C. AZARY.
APPARATUS FOR MAKING RETICULATED OR OPEN WORK WIRE RECEPTACLES.
APPLICATION FILED NOV. 19, 1902.
NO MODEL.
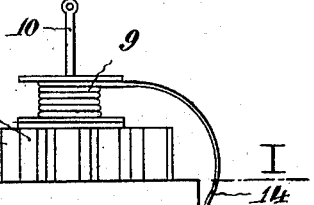
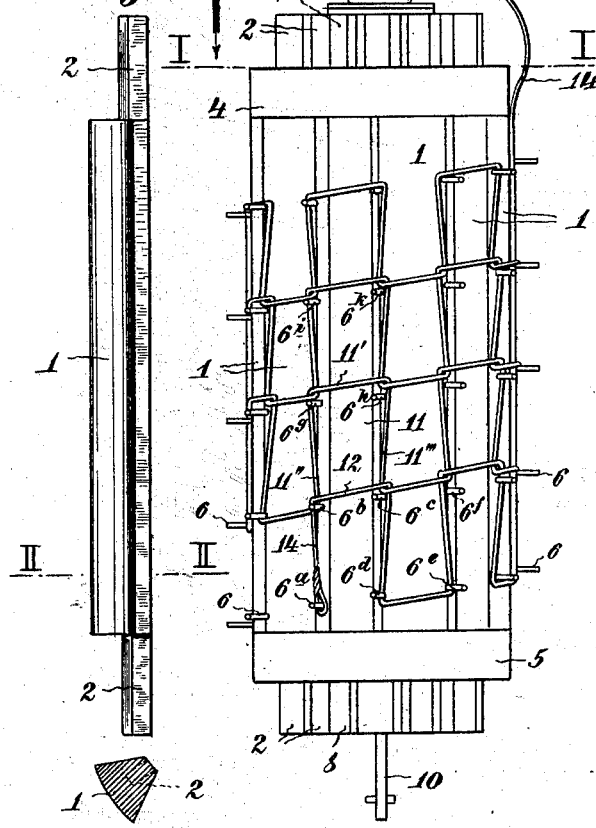
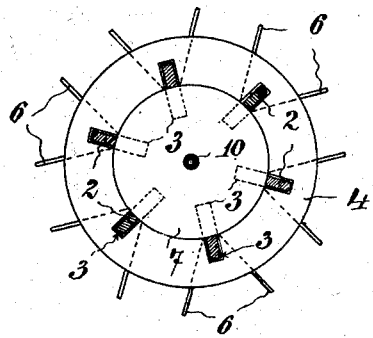
Witnesses.
Inventor
Cornelius Azary
Att'y.

No. 752,748. Patented February 23, 1904.

UNITED STATES PATENT OFFICE.

CORNELIUS AZARY, OF LIPPA, AUSTRIA-HUNGARY.

APPARATUS FOR MAKING RETICULATED OR OPEN-WORK WIRE RECEPTACLES.

SPECIFICATION forming part of Letters Patent No. 752,748, dated February 23, 1904.

Application filed November 19, 1902. Serial No. 131,936. (No model.)

*To all whom it may concern:*

Be it known that I, CORNELIUS AZARY, a subject of the Emperor of Austria-Hungary, residing at Lippa, in the Empire of Austria-Hungary, have invented certain new and useful Improvements in Apparatus for Manufacturing Reticulated or Open-Work Wire Receptacles, of which the following is a specification.

The present invention relates to an apparatus for manufacturing wire sacks of unlimited length which, if filled with stones, gravel, or similar material, are particularly adapted for the construction of stream-beds and shore-banks dike-protections, water-dams in valleys, and the like. Apart from its cheapness such sacks have the advantage that they are absolutely reliable in case of a flood against washing away, because they cannot be moved on account of their enormous weight and unlimited length even by the swiftest current. For the manufacture of such a wire sack a device is employed, according to the present invention, which, together with utmost simplicity and cheapness, not only makes rapid working possible, but which at the same time is very easily transportable and when mounted upon movable structures which are placed on open tracks or ships provides means for the manufacture and the laying of the wire sack at the place where it is wanted in a continuous working period.

The present invention is shown in the accompanying drawings, in which—

Figure 1 is a vertical elevation of the device; Fig. 2, a horizontal section taken on line I I in Fig. 1. Figs. 3 and 3ª illustrate one part of the device, as explained hereinafter, the latter being a section on line II II of the former.

The device consists of a number of vertical columns 1 of sector-shaped cross-sections, Fig. 3ª, which are arranged in pairs and at equal distances apart, their arc portions lying in a circle. At the upper and lower ends they are provided with studs 2, by means of which they are secured in the radial slots 3 of disks 4 5, as shown in Fig. 2, while their side planes are parallel to each other. In the direction of these side planes are pins 6, standing normal to the arch portions of the columns 1. These pins are arranged so as to run in a spiral line around the cylinder plane, which is imagined to be formed by the arc portions of the columns. The slots 3 in the plates 4 and 5 are twice as long as the breadth of studs 2 of columns 1, so that these studs can be moved in the slots in radial direction. The length of the pins 6 corresponds to the breadth of the studs 2—*i. e.*, to half the length of the slots 3—so that in case the columns in said slots are moved toward the center of disks 4 and 5 the pin will not project beyond the circumference formed by the arcs of columns 1. In order to hold the columns in their outer positions, as shown in Fig. 2, against unintended sliding, removable disks or plates 7 and 8 are fixed between the studs 2, which project above and beneath the disks 4 and 5 to keep the columns in position. The device may also be provided at the upper part with a drum 9 for winding up the wire-supply and a spindle 10 to support it by.

The forming of the wire sack by means of the device described above is carried out as follows: The wire 14 is twisted with its end around pin 6ª, from there led across the upper pin 6ᵇ and laid around pin 6ᶜ, which is arranged in the same spiral line, but on the next column. Then it is led around pin 6ᵈ to pins 6ᵉ and 6ᶠ, and so on, always along the two lower spiral lines, which are above each other, led back to the starting-column 1. From there forth in the same manner as the meshes 6ª 6ᵇ 6ᶜ 6ᵈ, &c., and above these loose meshes 6ᵇ 6ᵍ 6ʰ 6ᶜ, &c., are formed—that is to say, above every mesh of the lower two spiral lines one loose mesh is formed on the upper two spirals. Now the formation of meshes is stopped and one proceeds to the connection of the two mesh-rows laid above each other—*i. e.*, to the formation of finished meshes. For this purpose the parts 11' of the upper meshes are removed from the pins 6ᵍ and 6ʰ, the mesh 11' 11'' 11''' is turned three hundred and sixty degrees on the part 12 of the lower mesh in the space between the uprights 1, carrying said meshes, and the part 11' of the completed mesh 11 is again placed on the pins 6ᵍ and 6ʰ. In this manner all the following meshes are connected with each other, and after this the formation of loose meshes by laying the wire round pivots $6^g$ $6^h$ $6^i$ $6^k$ may be taken up again. Now if the formation of the wire sack is carried out up to the entire height of the device then plates 7 8 are removed and all columns are moved in their slits 3 toward the axis of the device, while the pins 6 release the formed meshes. The finished wire sack may now be let down as far as the height of the columns in order to be hung with its upper meshes upon the lower pins, when the columns are brought back in their former position and the plates 8 7 are inserted again, and the work may again be carried on in the above-described manner. Thus a sack with meshes following up each other in a spiral line is formed, which may be made in any desired and unlimited length. The filling of this wire sack with broken stones or gravel, &c., is done through openings in the disks 4 5, or it may be done beneath the apparatus through the meshes of the wire-netting in case not too big material is employed. The wire sack when filled is laid upon the stream bed or shore to be protected—for instance, in a serpentine—in which manner at a very small cost and in a continuous working period a bed or shore protection of several kilometers length may be made, or even whole rivers may be protected by a single wire sack.

Having thus described my invention, what I claim, and desire to secure by Letters Patent, is—

1. In an apparatus for manufacturing reticulated or open-work wire receptacles, the combination of a series of movable bars arranged in a circular position, means for holding said bars in adjusted position, and pins projecting from said bars around which the wire may be bent.

2. In an apparatus of the nature set forth, the combination of a plurality of sector-shaped parallel columns, pins projecting from said columns arranged to form a spiral about said columns, bearing-plates for said columns, and means for adjusting said columns toward or away from a common center.

3. In combination with a plurality of sector-shaped columns provided with angular studs at their extremities, disks provided with elongated radial slots for engaging said lugs to hold said columns about a common center and with their arc portions at times in a common circumference, disk-plates adapted to engage said lugs and hold the columns in outward adjusted positions, pins projecting from said lugs arranged spirally about said columns, the arrangement being such that when the columns are adjusted toward the center, the outer ends of the pins will come substantially within the circumference formed about the arc portions of the columns before such adjustment.

In testimony that I claim the foregoing as my invention I have signed my name in presence of two subscribing witnesses.

CORNELIUS AZARY.

Witnesses:
CARL BECKER,
LOUIS VÁNDORZ.